US011281559B2

(12) United States Patent
Matsuo et al.

(10) Patent No.: US 11,281,559 B2
(45) Date of Patent: Mar. 22, 2022

(54) INFORMATION PROCESSING APPARATUS, INFORMATION PROCESSING SYSTEM, AND STORAGE MEDIUM

(71) Applicant: FUJITSU LIMITED, Kawasaki (JP)

(72) Inventors: Miyuki Matsuo, Yokohama (JP); Kohta Nakashima, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 507 days.

(21) Appl. No.: 16/118,498

(22) Filed: Aug. 31, 2018

(65) Prior Publication Data
US 2019/0073287 A1 Mar. 7, 2019

(30) Foreign Application Priority Data

Sep. 6, 2017 (JP) .............................. JP2017-170830

(51) Int. Cl.
G06F 11/34 (2006.01)
G06F 11/30 (2006.01)

(52) U.S. Cl.
CPC ........ *G06F 11/3447* (2013.01); *G06F 11/302* (2013.01); *G06F 11/3006* (2013.01); *G06F 11/3062* (2013.01); *G06F 11/3065* (2013.01)

(58) Field of Classification Search
CPC ............. G06F 11/3447; G06F 11/3006; G06F 11/302; G06F 11/3062; G06F 11/3065
See application file for complete search history.

(56) References Cited

U.S. PATENT DOCUMENTS 6,513,124 B1 * 1/2003 Furuichi et al. ........ G06F 17/50
713/322
9,191,202 B2 * 11/2015 Isozaki ................. H04L 9/0822
(Continued)

FOREIGN PATENT DOCUMENTS

CN 101975436 A * 2/2011
CN 105279079 A * 1/2016
(Continued)

OTHER PUBLICATIONS

Benini et al., "Regression models for behavioral power estimation" (Year: 1990).*
(Continued)

*Primary Examiner* — Rehana Perveen
*Assistant Examiner* — Nupur Debnath
(74) *Attorney, Agent, or Firm* — Fujitsu Patent Center

(57) ABSTRACT

An information processing apparatus includes a memory; and a processor coupled to the memory and configured to generate a performance model for calculating a performance value of an application program from a power restriction for each set of parameters of the application program, based on data acquired when a computing apparatus executes the application program for each set of parameters of the application program under each of a plurality of power restrictions; calculate, for each set of parameters of the application program, the performance value of the application program from a first power restriction different from any of the plurality of power restrictions, based on the performance model generated for each set of parameters of the application program; and output a set of parameters of the application program corresponding to a highest performance value of the calculated performance values.

17 Claims, 23 Drawing Sheets

| | EXECUTION PATTERN #1 | PERFORMANCE VALUE | OPERATING FREQUENCY | CPU CONSUMPTION POWER |
|---|---|---|---|---|
| | POWER RESTRICTION #10 | 2132.5 | 1499.3 | 223.8 |
| | POWER RESTRICTION #20 | 1906.3 | 1447.0 | 204.5 |
| | POWER RESTRICTION #31 | 1724.3 | 1324.4 | 176.2 |
| | POWER RESTRICTION #41 | 1720.6 | 1233.8 | 167.7 |

(56) References Cited

U.S. PATENT DOCUMENTS

| | | | | |
|---|---|---|---|---|
| 9,355,000 | B1* | 5/2016 | Biswas | G06F 11/3062 |
| 10,223,228 | B2* | 3/2019 | Boss et al. | G06F 11/30 |
| 2013/0326459 | A1* | 12/2013 | Bickford | G06F 30/30 |
| | | | | 716/133 |
| 2016/0062867 | A1* | 3/2016 | Rodriguez | G06Q 10/10 |
| | | | | 702/186 |
| 2017/0261949 | A1* | 9/2017 | Hoffmann | G06N 7/005 |
| 2018/0284737 | A1* | 10/2018 | Celia | G05B 23/0294 |
| 2018/0322036 | A1* | 11/2018 | Alam | G06F 11/3688 |

FOREIGN PATENT DOCUMENTS

| | | | | |
|---|---|---|---|---|
| CN | 105930248 A * | 9/2016 | | G06F 11/30 |
| CN | 106991030 A * | 7/2017 | | |
| JP | 11-353052 | 12/1999 | | |
| JP | 2009-140222 | 6/2009 | | |
| JP | 2018011497 A * | 6/2016 | | Y02E 40/70 |
| WO | WO-2013035659 A1 * | 3/2013 | | H04M 1/72403 |
| WO | WO2017168940 A1 * | 3/2016 | | B60L 15/40 |

OTHER PUBLICATIONS

Sunpyo Hong, Hyesoon Kim, "An Integrated GPU Power and Performance Model", ISCA'10, Jun. 19-23, 2010, Saint-Malo, France (Year: 2010).*

Gerald Tesauro, Rajarshi Das, Hoi Chan, Jeffrey O. Kephart, Charles Lefurgy, David W. Levine and Freeman Rawson "Managing Power Consumption and Performance of Computing Systems Using Reinforcement Learning" (Year: 2007).*

Margaret Martonosi, David Brooks Pradip Bose Modeling and Analyzing CPU Power and Performance: Metrics, Methods,and Abstractions (Year: 2001).*

Suzanne Rivoire, Parthasarathy Ranganathan, Christos Kozyrakis; "A Comparison of High-Level Full-System Power Models"; https://www.usenix.org/legacy/event/hotpower08/tech/full_papers/rivoire/rivoire_html/index.html (Year: 2008).*

Xiaobo Fan, Wolf-Dietrich Weber, Luiz Andre Barroso; "Power Provisioning fora Warehouse-sized Computer" ISCA'07, Jun. 9-13, 2007, San Diego, California (Year: 2007).*

G. Tesauro, R. Das, H. Chan, J. O. Kephart, C. Lefurgy, D. W. Levine and F. Rawson; "Managing Power Consumption and Performance of Computing Systems Using Reinforcement Learning"; (Year: 2007).*

Xiwei Qiu, Yuanshun Dai, Yanping Xiang, and Liudong Xing; "A Hierarchical Correlation Model for Evaluating Reliability, Performance, and Power Consumption of a Cloud Service"; IEEE Transactions on Systems, Man, and Cybernetics: Systems, vol. 46, No. 3, Mar. 2016 (Year: 2016).*

* cited by examiner

FIG. 6

|  | POWER CAP #1 | | POWER CAP #2 | |
|---|---|---|---|---|
|  | TIME | POWER | TIME | POWER |
| POWER RESTRICTION #10 | 1S | 215W | 10ms | 258W |
| POWER RESTRICTION #11 | 1S | 215W | 10ms | 215W |
| POWER RESTRICTION #20 | 1S | 200W | 10ms | 258W |
| POWER RESTRICTION #21 | 1S | 200W | 10ms | 200W |
| POWER RESTRICTION #30 | 1S | 185W | 10ms | 258W |
| POWER RESTRICTION #31 | 1S | 185W | 10ms | 185W |
| POWER RESTRICTION #40 | 1S | 170W | 10ms | 258W |
| POWER RESTRICTION #41 | 1S | 170W | 10ms | 170W |
| ⋮ | ⋮ | ⋮ | ⋮ | ⋮ |

FIG. 12

| POWER RESTRICTION |
|---|
| POWER RESTRICTION #10 |
| POWER RESTRICTION #20 |
| POWER RESTRICTION #31 |
| POWER RESTRICTION #41 |

FIG. 13

| | EXECUTION PATTERN #1 | PERFORMANCE VALUE | OPERATING FREQUENCY | CPU CONSUMPTION POWER | |
|---|---|---|---|---|---|
| ⋰ | EXECUTION PATTERN #N | PERFORMANCE VALUE | OPERATING FREQUENCY | CPU CONSUMPTION POWER | |
| | POWER RESTRICTION #10 | 2132.5 | 1499.3 | 223.8 | |
| | POWER RESTRICTION #20 | 1906.3 | 1447.0 | 204.5 | |
| | POWER RESTRICTION #31 | 1724.3 | 1324.4 | 176.2 | |
| | POWER RESTRICTION #41 | 1720.6 | 1233.8 | 167.7 | ⋰ |

FIG. 15

| COEFFICIENT #1 | 1.4 |
|---|---|
| COEFFICIENT #2 | 3.9 |
| COEFFICIENT #3 | 2.1 |
| COEFFICIENT #4 | 6.0 |
| COEFFICIENT #5 | 2.2 |
| COEFFICIENT #6 | 4.5 |
| CONSTANT #1 | 11.2 |
| CONSTANT #2 | 3.5 |
| CONSTANT #3 | 8.1 |

FIG. 18

| EXECUTION PATTERN | PERFORMANCE VALUE |
|---|---|
| EXECUTION PATTERN #1 | 1846.5 |
| EXECUTION PATTERN #2 | 1871.2 |
| EXECUTION PATTERN #3 | 1803.3 |
| EXECUTION PATTERN #4 | 1829.8 |
| ⋮ | ⋮ |

FIG. 20

| COEFFICIENT #7 | 4.2 |
|---|---|
| COEFFICIENT #8 | 1.5 |
| CONSTANT #4 | 7.3 |

INFORMATION PROCESSING APPARATUS, INFORMATION PROCESSING SYSTEM, AND STORAGE MEDIUM

CROSS-REFERENCE TO RELATED APPLICATION

This application is based upon and claims the benefit of priority of the prior Japanese Patent Application No. 2017-170830, filed on Sep. 6, 2017, the entire contents of which are incorporated herein by reference.

FIELD

The embodiments discussed herein are related to an information processing apparatus, an information processing system, and a storage medium.

BACKGROUND

As a scale is increased and a performance is enhanced for an HPC (High Performance Computing) system, an increase in consumption power occurs, which is now a problem.

To suppress consumption power of an HPC system, there is a possibility that a power restriction (for example, a restriction of consumption power per unit time) is imposed on a user of the HPC system. The user of the HPC system operates the HPC system such that consumption power does not exceed a limit due to a change in an operation frequency of a processor or a change in the number or type of execution instructions of an application program.

The performance (for example, the amount of computation per unit time) of an application program executed by the HPC system may vary depending on a parameter value of the application program. For example, in the case of a matrix product computation program, the performance of the application program changes depending on a total size of a matrix, sizes of parts (also called tiles) which are generated as a result of dividing the matrix in a case where the matrix is divided in the calculation.

Thus, to achieve a sufficient performance with the limited power, the user adjusts parameter values of the application program executed by the HPC system. However, a value that results in a sufficiently high performance under a certain power restriction is not exactly effective in another power restriction. That is, optimum parameter values may be different depending on a power restriction. As a related art, for example, Japanese Laid-open Patent Publication No. 2009-140222 and Japanese Laid-open Patent Publication No. 11-353052 are disclosed.

SUMMARY

According to an aspect of the invention, an information processing apparatus includes a memory; and a processor coupled to the memory and configured to generate a performance model for calculating a performance value of an application program from a power restriction for each set of parameters of the application program, based on data acquired when a computing apparatus executes the application program for each set of parameters of the application program under each of a plurality of power restrictions; calculate, for each set of parameters of the application program, the performance value of the application program from a first power restriction different from any of the plurality of power restrictions, based on the performance model generated for each set of parameters of the application program; and output a set of parameters of the application program corresponding to a highest performance value of the calculated performance values.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of data stored in a restriction data storage unit;

FIG. 12 is a diagram illustrating an example of a specified power restriction;

FIG. 13 is a diagram illustrating an example of data stored in a collected data storage unit;

FIG. 15 is a diagram illustrating an example of data stored in a model data storage unit according to the first embodiment;

FIG. 18 is a diagram illustrating an example of data stored in an output data storage unit;

FIG. 20 is a diagram illustrating an example of data stored in a model data storage unit according to the second embodiment;

DESCRIPTION OF EMBODIMENTS

In an aspect, the present disclosure provides a technique of setting a parameter of an application program to a proper value depending on a power restriction.

First Embodiment

Figure 1:
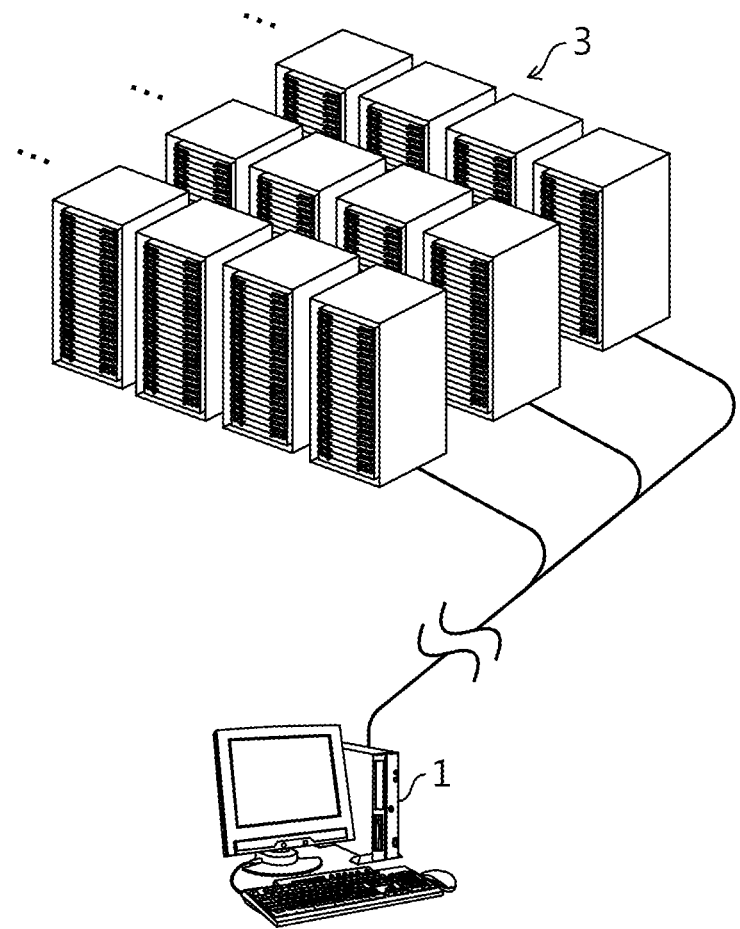
FIG. 1 is a diagram illustrating an outline of a system according to an embodiment.

FIG. 1 is a diagram illustrating an outline of a system according to an embodiment. An HPC system 3 is installed, for example, in a data center and includes a plurality of racks on which a plurality of computation nodes are installed. The HPC system 3 is used by a plurality of users such that one or a plurality of computation nodes are assigned to each user depending on an amount of computation or the like. A user terminal 1 operated by a user is connected to the HPC system 3 via a wire such that it is allowed to control the computation node in the HPC system 3 to execute an application program. Note that the user terminal 1 may be wirelessly connected to the HPC system 3. The application program is, for example, an execution program of a particular calculation (for example, a matrix calculation).

Figure 2:
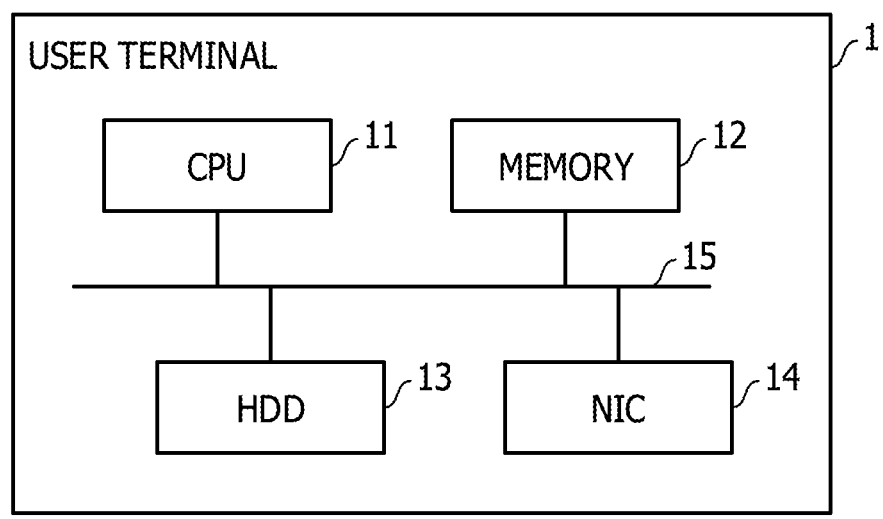
FIG. 2 is a hardware configuration diagram of a user terminal.

FIG. 2 is a hardware configuration diagram of a user terminal 1. The user terminal 1 includes a CPU (Central Processing Unit) 11, a memory 12 such as a DRAM (Dynamic Random Access Memory), an HDD (Hard Disk Drive) 13, and a NIC (Network Interface Card) 14. The CPU 11, the memory 12, the HDD 13, and the NIC 14 are connected to each other via a bus 15.

Figure 3:
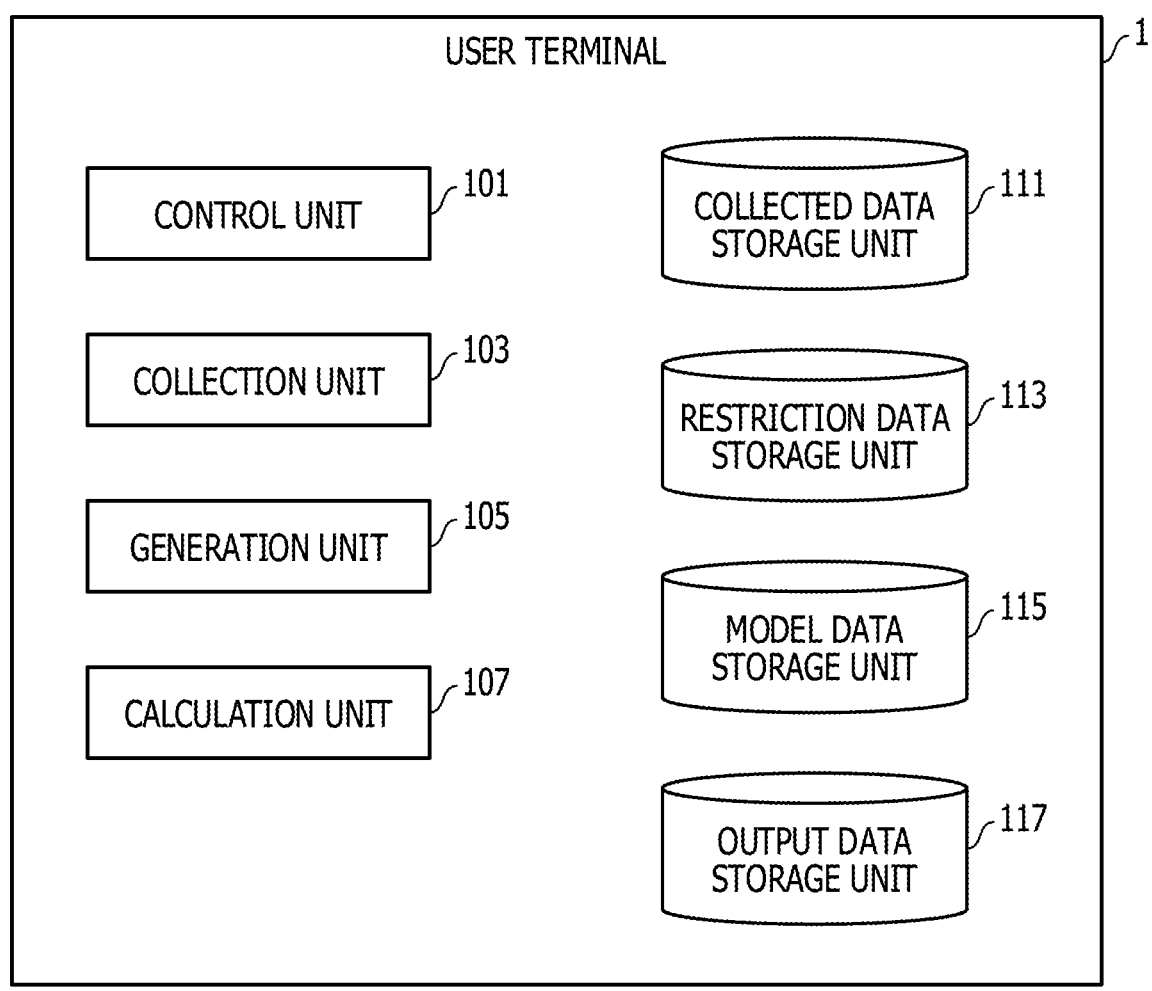
FIG. 3 is a functional block diagram of a user terminal.

FIG. 3 is a functional block diagram of the user terminal 1. The user terminal 1 includes a control unit 101, a collection unit 103, a generation unit 105, a calculation unit 107, a collected data storage unit 111, a restriction data storage unit 113, a model data storage unit 115, and an output data storage unit 117.

The control unit 101, the collection unit 103, the generation unit 105, and the calculation unit 107 are realized by executing, by the CPU 11, a program loaded in the memory 12. The collected data storage unit 111, the restriction data storage unit 113, the model data storage unit 115, and the output data storage unit 117 are realized in the memory 12 or the HDD 13.

The control unit 101 controls processing executed by the collection unit 103, the generation unit 105, and the calculation unit 107. The collection unit 103 transmits, to the HPC system 3, a setting instruction including power restriction setting stored in the restriction data storage unit 113 and an execution instruction including a value of a parameter of the application program, and the collection unit 103 collects data from the HPC system 3 and stores the collected data in the collected data storage unit 111. The generation unit 105 generates a performance model based on the data stored in the collected data storage unit 111, and stores the generated performance model in the model data storage unit 115. The calculation unit 107 calculates a value indicating a performance of the application program (hereinafter referred to as a performance value) from the performance model stored in the model data storage unit 115 and an imposed power restriction, and the calculation unit 107 stores the calculated performance value in the output data storage unit 117.

Figure 4:
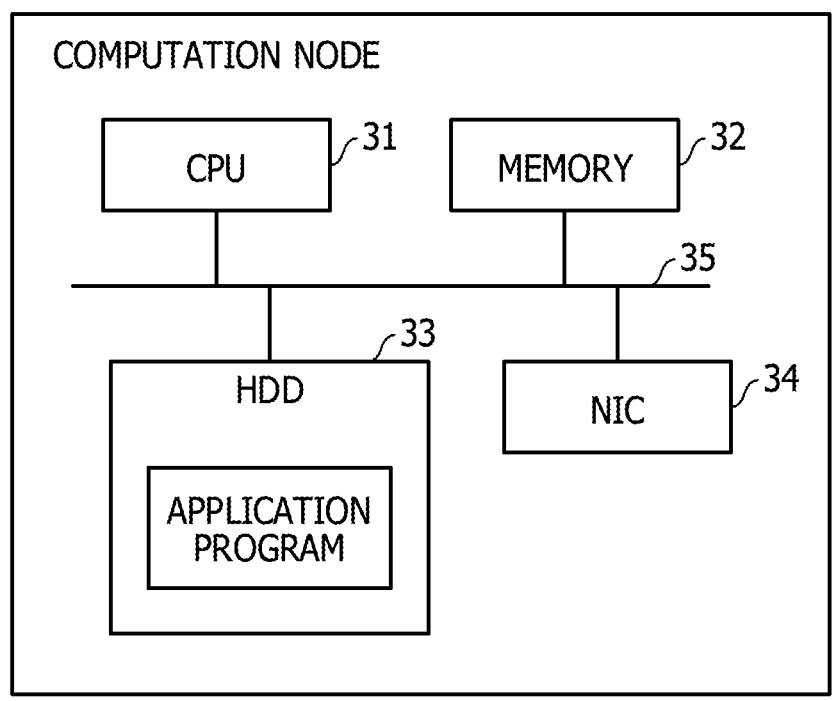
FIG. 4 is a diagram illustrating a hardware configuration of a computation node in an HPC system.

FIG. 4 is a diagram illustrating a hardware configuration of a computation node in the HPC system 3. The computation node includes a CPU 31 having a power control function, a memory 32 such as a DRAM, an HDD 33 storing an application program, and a NIC 34. The CPU 31, the memory 32, the HDD 33, and the NIC 34 are connected to each other via a bus 35. The power control function controls the consumption power of the CPU 31 and that of the memory 32 depending on the set power restriction. In a register in the CPU 31, a value for calculating the consumption power (watt) of the CPU 31 and the memory 32 and a value for calculating the operating frequency (MHz) of the CPU 31 are stored. The CPU 31 may include a plurality of cores.

Figure 5:
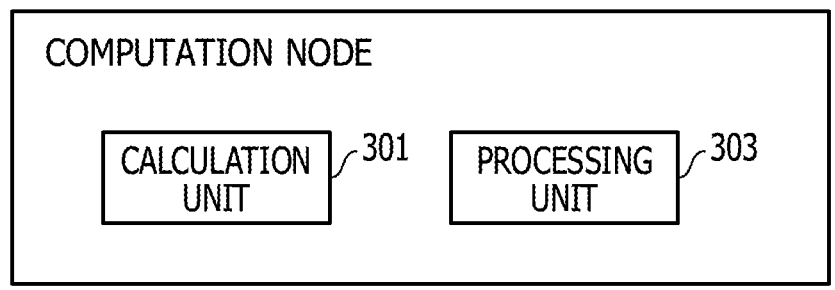
FIG. 5 is a functional block diagram of a computation node in an HPC system.

FIG. 5 is a functional block diagram of a computation node in the HPC system 3. The computation node includes a calculation unit 301 and a processing unit 303.

The calculation unit 301 is realized by loading an application program in the memory 32 and executing the application program by the CPU 31. The processing unit 303 is realized by loading a program other than the application program in the memory 32 and executing the program by the CPU 31.

The calculation unit 301 performs a calculation associated with the application program. The processing unit 303 performs a process according to a setting instruction received from the user terminal 1 and performs a process according to an execution instruction received from the user terminal 1. The processing unit 303 also performs a process of collecting data and transmitting the collected data to the user terminal 1.

Figure 7:
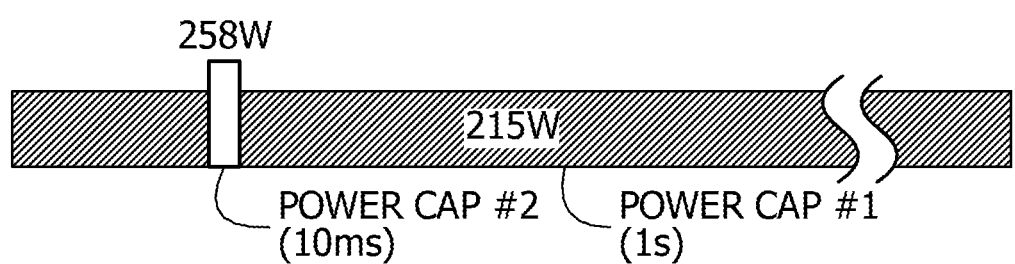
FIG. 7 is a diagram illustrating power capping.

FIG. 6 is a diagram illustrating an example of data stored in the restriction data storage unit 113. In the example illustrated in FIG. 6, a plurality of power restrictions are stored in the restriction data storage unit 113. Herein, a power cap is an average value of consumption power usable in a certain time period. In the present embodiment, power cap #1 and power cap #2 are set. In an example illustrated in FIG. 7, it is allowed to use an average power of 215 W in a unit time (1 second in the example illustrated in FIG. 7) (power cap #1). However, it is allowed to use an average power of 258 W in a 10-millisecond period in the unit time (power cap #2). The power cap is determined by, for example, a system manager based on a climate, suppliable consumption power, and/or other factors. In the example illustrated in FIG. 6, in power restrictions whose one's digit is 0, there is a difference in power between the power cap #1 and the power cap #2, while in power restrictions whose one's digit is 1, there is no difference in power between the power cap #1 and the power cap #2.

Figure 8:
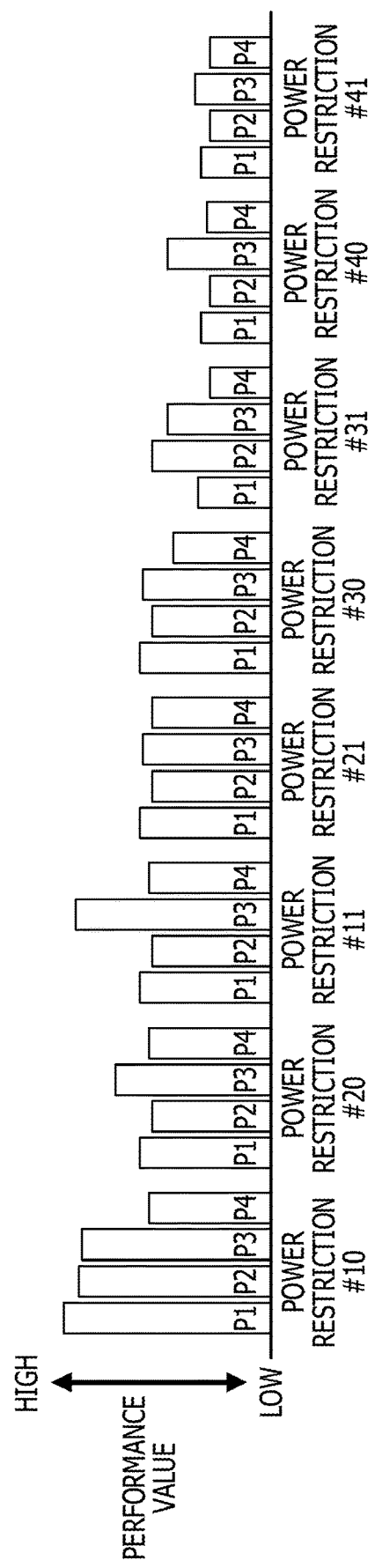
FIG. 8 is a diagram illustrating performance values for different power restrictions.

FIG. 8 is a diagram illustrating performance values for each of various power restrictions. In the example illustrated in FIG. 8, performance values are indicated for a case where the application program is executed in four execution patterns for each power restriction. The execution pattern is a set of parameter values of an application program. In the example illustrated in FIG. 8, execution patterns P1 to P4 are generated by combinations of the total matrix size and the tile size.

As illustrated in FIG. 8, there is a general tendency that the performance value increases with the value of consumption power of the power cap. Note that an execution pattern that provides a highest performance value depending on the power restriction. For example, for the power restriction #10, the power restriction #21, and the power restriction #30, a highest performance is achieved when the execution pattern P1 is used. For the power restriction #31, a highest performance is achieved when the execution pattern P2 is used. For the power restriction #20, the power restriction

11, the power restriction #40, and the power restriction #41, a highest performance is achieved when the execution pattern P3 is used.

Note that the parameter values may be set, for example, as arguments of a command, or as environment variables (that is, as variables that are effective for a process activated from a shell), or the parameter values may be set in a file that is referred to when the application program is executed. For example, in the case of a program for parallel processing, the number of threads executed in parallel is set by an argument of a command, for example, such that "program1— omp_num_threads 24" or by an environment variable, for example, such that "export OMP_NUM_THREADS=24".

Figure 9:
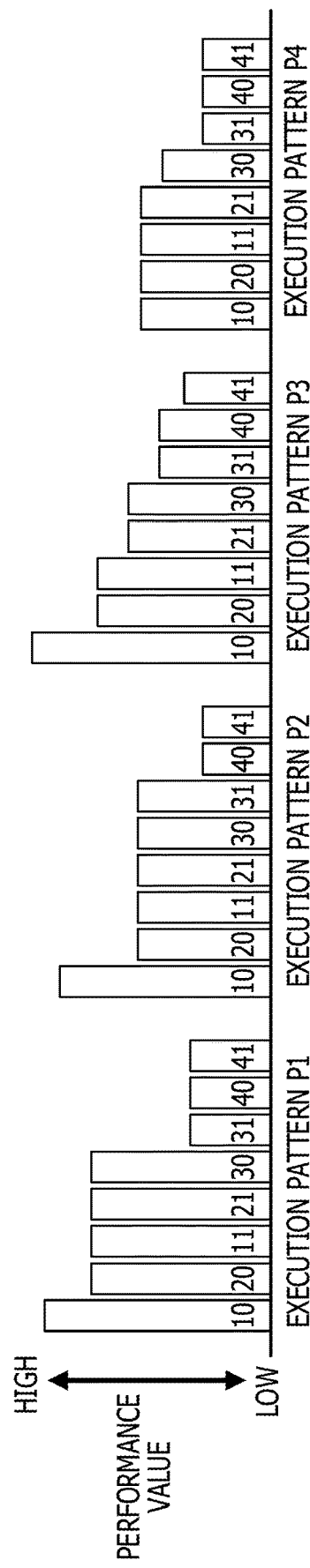
FIG. 9 is a diagram illustrating performance values for different execution pattern.

FIG. 9 is a diagram illustrating an example of a performance value for each of various execution patterns. In the example illustrated in FIG. 9, a performance value obtained when an application program is executed under eight power restrictions is illustrated for each of various execution patterns.

As can be seen from FIG. 9, the performance value can vary depending on the power restriction even for the same execution pattern. For example, when the execution pattern P1 is used, there is an apparent difference in performance value between the power restriction #31 and the power restrictions #20, #11, #21, and #30. In contrast, when the execution pattern P2 is used, there is no apparent difference in performance value between the power restriction #31 and the power restrictions #20, #11, #21, and #30. For the execution patterns P1 to P3, the performance value for the power restriction #10 is apparently higher than the performance values for the other power restrictions. However, for the execution pattern P4, there is no apparent difference in performance value between the power restriction #10 and the power restriction #20, #11, and #21.

As described above, the performance of an application program can vary depending on parameter values used when the application program is executed. Therefore, it is possible to increase the performance by tuning the parameter values. However, there is a possibility that an increase in performance may result in an increase in consumption power.

Figure 10:
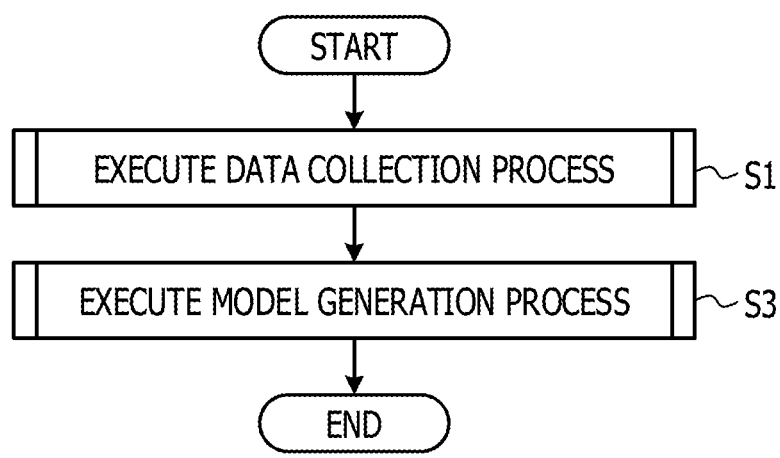
FIG. 10 is a diagram illustrating a processing flow executed by a user terminal in response to accepting from a user a command to generate a performance model.

FIG. 10 is a diagram illustrating a processing flow of a process executed by the user terminal 1 in response to receiving a performance model generation instruction from a user.

On receiving the performance model generation instruction from the user, the control unit 101 in the user terminal 1 calls the collection unit 103. In response, the collection unit 103 executes a data collection process (step S1 in FIG. 10).

Figure 11:
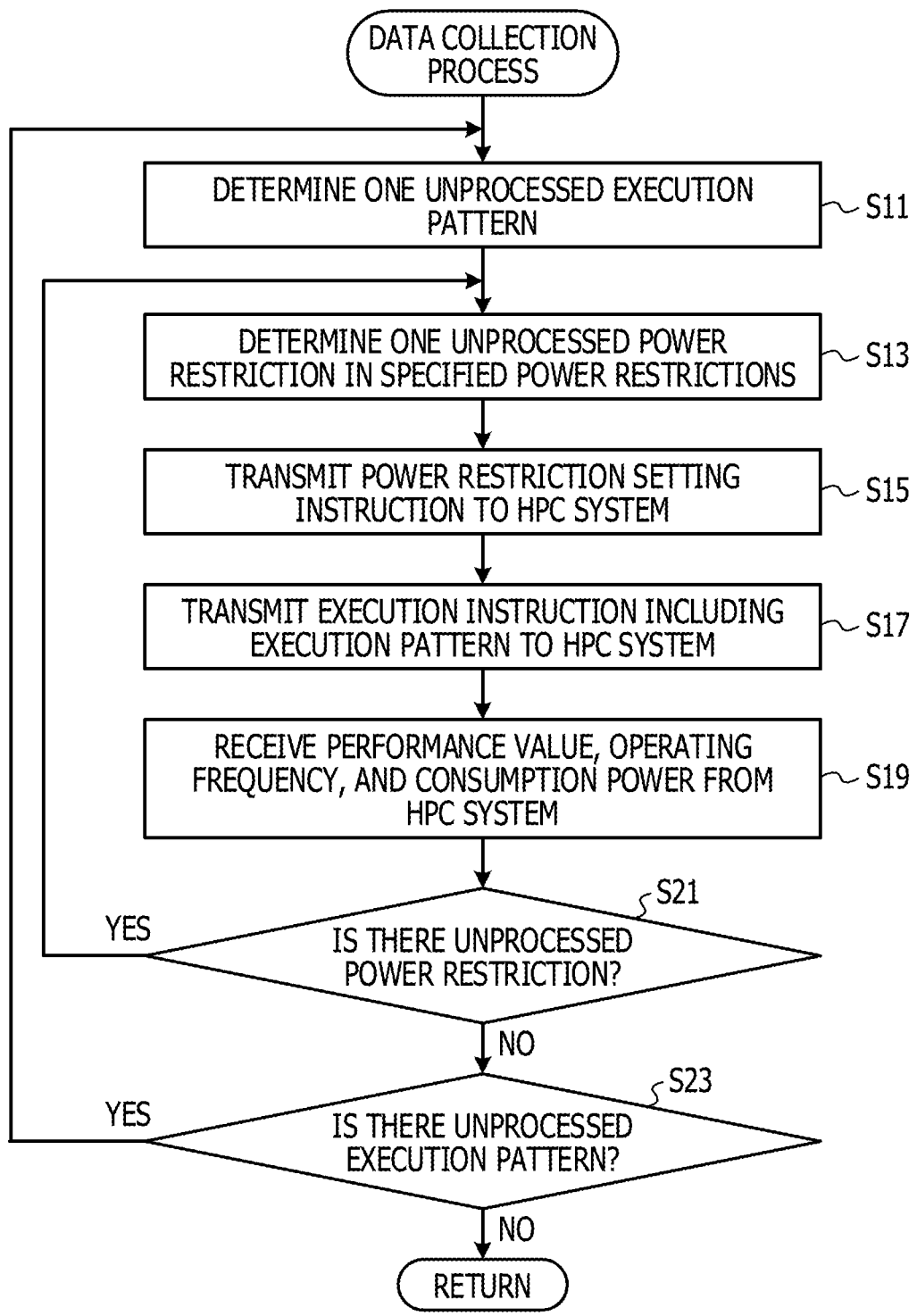
FIG. 11 is a diagram illustrating a processing flow of a data collection process.

FIG. 11 is a diagram illustrating a processing flow of the data collection process.

The collection unit 103 determines one unprocessed execution pattern in a plurality of execution patterns specified by the user (step S11 in FIG. 11). Note that when the user specifies execution patterns to be evaluated, but the user may not specify execution patterns for which performances can be estimated from results for other execution patterns.

The collection unit 103 determines one unprocessed power restriction in the specified power restrictions (step S13). Here, the specified power restrictions refer to power restrictions specified in advance by the user as power restrictions used in generating the performance model wherein the power restrictions are selected from the power restrictions whose associated data is stored in the restriction data storage unit 113 (in the example illustrated in FIG. 6, power restrictions #10, #11, #20, #21, #30, #31, #40, and #41). Only part of the all power restrictions are used in the generation of the performance model because use of all power restrictions results in so large an increase in computation time that it is unrealistic to perform the computation, while use of only part of the all power restrictions allows it to obtain high enough accuracy in the generation of the performance model.

FIG. 12 is a diagram illustrating an example of a set of specified power restrictions. In the example illustrated in FIG. 12, the power restriction #10, the power restriction #20, the power restriction #31, and the power restriction #41 are specified.

The collection unit 103 transmits a setting instruction including the power restriction determined in step S13 to a computation node, in the computation nodes of the HPC system 3, to be used in executing the application program by the user terminal 1 (step S15). In response to receiving the setting instruction, the processing unit 303 of the computation node executes a process of setting the CPU 31 in terms of the power caps #1 and #2 of the power restriction included in the setting instruction. This causes the computation node to execute the calculation such that the consumption power is lower than or equal to the power cap of the power restriction specified by the user.

The collection unit 103 transmits the execution instruction including the execution pattern determined in step S11 to the computation node, in the computation nodes of the HPC system 3, to be used in executing the application program by the user terminal 1 (step S17). Alternatively, in step S17, an application program, a setting file, and/or the like, in which the parameter values included in the execution pattern are reflected, may be transmitted to the computation node.

Upon receiving the execution instruction, the processing unit 303 of the computation node outputs the parameter values included in the execution instruction to the calculation unit 301. The calculation unit 301 starts executing the process of the application program according to the received parameter values. During the execution of the application program, the processing unit 303 acquires, from the registers of the CPU 31, values for calculating the consumption power of the CPU 31 and the consumption power of the memory 32 and a value for calculating the operating frequency of the CPU 31. However, for simplicity of explanation, it is assumed in the following description that only the value for calculating the consumption power of the CPU 31 and the value for calculating the operating frequency of the CPU 31 are used. During or after the execution of the application program, a performance value output by the calculation unit 301 is acquired by the processing unit 303. In the present embodiment, for example, when the operation of the CPU 31 becomes stable after the execution of the application program is started, the value for calculating the consumption power, the value for calculating the operating frequency of the CPU 31, and performance value are acquired. Alternatively, the average values and the average performance value during a period in which the operation of the CPU 31 is stable may be acquired.

The processing unit 303 calculates the consumption power of the CPU 31 from the value for calculating the consumption power and calculates the operating frequency of the CPU 31 from the value for calculating the operating frequency of the CPU 31. The processing unit 303 then transmits the consumption power of the CPU 31, the operating frequency of the CPU 31, and the acquired performance value to the user terminal 1.

The collection unit 103 receives the performance value, the operating frequency, and the consumption power from the HPC system 3, and stores them in the collected data storage unit 111 (step S19).

FIG. 13 is a diagram illustrating an example of data stored in the collected data storage unit 111. In the example illustrated in FIG. 13, a performance value, an operating frequency, and a consumption power are stored for each power restriction and for each execution pattern. Note that in the present embodiment, the operating frequency and the consumption power of the CPU 31 are used as index values associated with the operation of the computation node. Alternatively, for example, the consumption power of the memory 32, the temperature of the CPU 31, and/or the like may be used as index values.

The collection unit 103 determines whether there is an unprocessed power restriction (step S21). In a case where there is an unprocessed power restriction (Yes in step S21) the process return to step S13 (via Yes route after step S21).

On the other hand, in a case where there is no unprocessed power restriction (No in step S21), the collection unit 103 proceeds to step S23 (via No route after S21) in which the collection unit 103 determines whether there is an unprocessed execution pattern.

In a case where there is an unprocessed execution pattern (Yes in step S23), the process returns to step S11 (via Yes route after step S23).

On the other hand, in a case where there is no unprocessed execution pattern (No in step S23), the process returns to the calling process.

By executing the process described above, it is possible to prepare data for use in generating the performance model.

Referring again to FIG. 10, the control unit 101 in the user terminal 1 calls the generation unit 105. In response, the generation unit 105 executes a model generation process (step S3).

Figure 14:
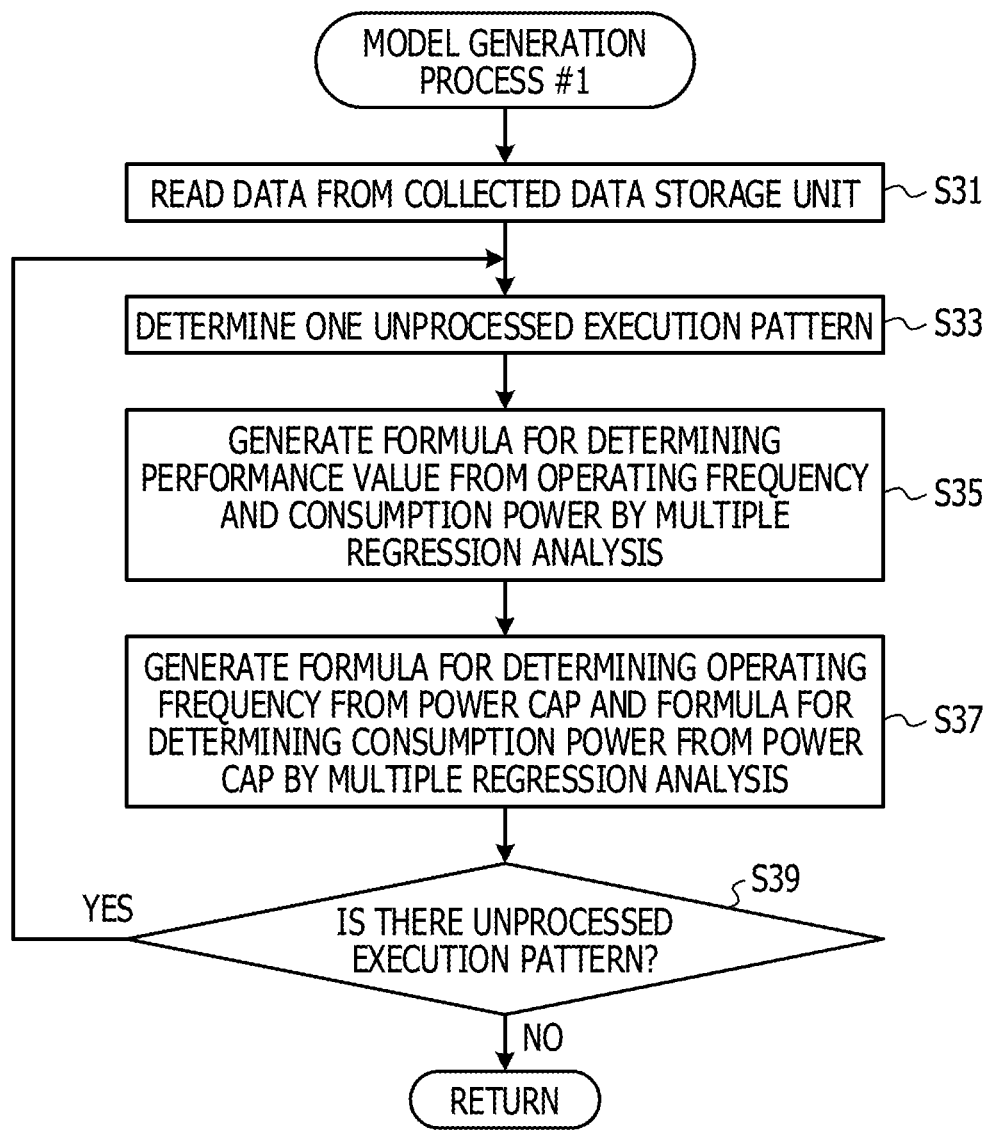
FIG. 14 is a diagram illustrating a processing flow of a model generation process according to a first embodiment.

FIG. 14 is a diagram illustrating a processing flow of the model generation process according to a first embodiment.

The generation unit 105 reads data from the collected data storage unit 111 (step S31 in FIG. 14). Note that in step S31, data associated with each execution pattern is read out.

The generation unit 105 determines one unprocessed execution pattern in a plurality of execution patterns specified by a user (step S33).

The generation unit 105 generates a formula for determining a performance value from an operating frequency and a consumption power for the execution pattern determined in step S33 by multiple regression analysis using the data read out in step S31 (step S35). A specific example of the formula is performance value=operating frequency*coefficient #1+consumption power*coefficient #2+constant #1. The generation unit 105 stores data (for example, coefficients, constants and the like) of the generated formula in the model data storage unit 115.

The generation unit 105 generates formulas for determining an operating frequency and a consumption power from a power cap for the execution pattern determined in step S33 by multiple regression analysis using the data read out in step S31 (step S37). Specific examples of the formulas are operating frequency=power cap #1*coefficient #3+power cap #2*coefficient #4+constant #2 and consumption power=power cap #1*coefficient #5+power cap #2*coefficient #6+constant #3. The generation unit 105 stores the data (for example, coefficients, constants, and the like) of the generated formulas in the model data storage unit 115.

FIG. 15 is a diagram illustrating an example of data stored in the model data storage unit 115 according to the first embodiment. In the example illustrated in FIG. 15, values are stored respectively for the coefficient #1 to coefficient #6 and the constant #1 to constant #3. The data such as that illustrated in FIG. 15 is generated for each execution pattern.

The generation unit 105 determines whether there is an unprocessed execution pattern (step S39).

In a case where there is an unprocessed execution pattern (Yes in step S39), the process returns to step S33 (via Yes route after step S39). On the other hand, in a case where there is no unprocessed execution pattern (No in step 39), the process returns to the calling process.

Use of the performance model generated via the process described above makes it possible to calculate performance values even for power restrictions for which the calculation is not executed by the HPC system 3. Thus, it becomes possible to reduce the number of times the calculation is performed by the HPC system 3. The operating frequency and the consumption power of the CPU 31 are closely related to the performance, and thus the method according to the present embodiment makes it possible to generate a high-accuracy performance model.

Figure 16:
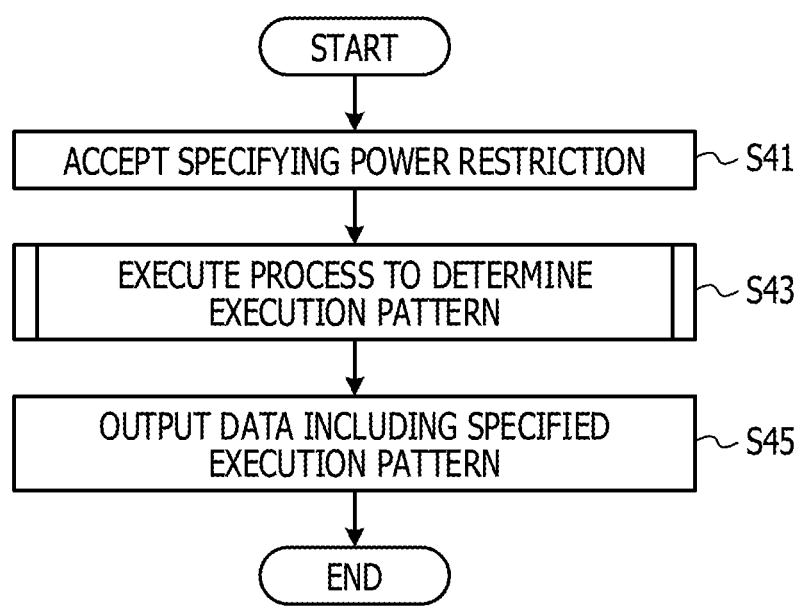
FIG. 16 is a diagram illustrating a processing flow of a process of outputting an execution pattern corresponding to a power restriction specified by a user.

FIG. 16 is a diagram illustrating a processing flow of a process of outputting an execution pattern corresponding to a power restriction specified by a user.

The control unit 101 in the user terminal 1 accepts specifying of a power restriction by a user (step S41 in FIG. 16). In response, the control unit 101 calls the calculation unit 107. The calculation unit 107 executes an execution pattern determination process (step S43).

Figure 17:
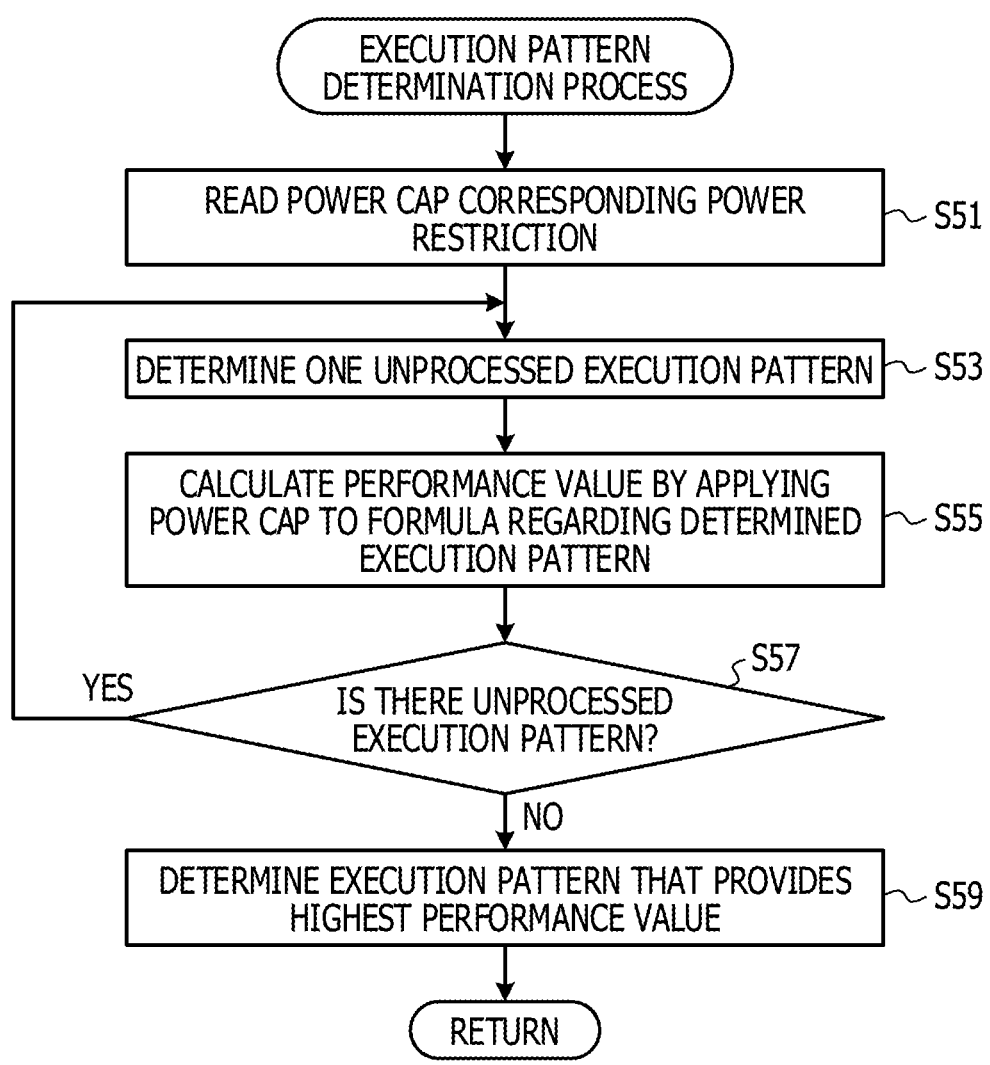
FIG. 17 is a diagram illustrating a processing flow of an execution pattern determination process.

FIG. 17 is a diagram illustrating a processing flow of the execution pattern determination process.

The calculation unit 107 reads power caps (power cap #1 and power cap #2 in this specific example) corresponding to the power restriction specified by the user from the restriction data storage unit 113 (step S51 in FIG. 17).

The calculation unit 107 determines one unprocessed execution pattern in the execution patterns whose data is stored in the model data storage unit 115 (step S53).

The calculation unit 107 reads the data of the formula associated with the execution pattern determined in step S53 from the model data storage unit 115. The calculation unit 107 then calculates the performance value for the execution pattern determined in step S53 by applying the power cap #1 and the power cap #2 to the formula with the read data (step S55). The calculation unit 107 stores the calculated performance value in the output data storage unit 117.

FIG. 18 is a diagram illustrating an example of data stored in the output data storage unit 117. In the example illustrated in FIG. 18, performance values calculated for the respective execution patterns are stored.

The calculation unit 107 determines whether there is an unprocessed execution pattern (step S57).

In a case where there is an unprocessed execution pattern (Yes in step S57), the process return to step S53 (via Yes route after step S57).

On the other hand, in a case where there is no unprocessed execution pattern (No in step 57), the calculation unit 107 performs a process as follows. That is, the calculation unit 107 determines an execution pattern resulting in a highest performance value in the calculation in step S55 (step S59). Thereafter the process returns to the calling process.

Referring again to FIG. 16, the control unit 101 outputs data including the execution pattern determined in step S43 to an output apparatus (for example, a monitor) of the user terminal 1 (step S45). Thereafter, the process ends. The data output in step S45 may include an execution pattern other than the execution pattern determined in step S43. In this case, it is desirable to output such an execution pattern such that this execution pattern is distinguishable (for example, by color) from the execution pattern determined in step S43.

This makes it possible for the user of the user terminal 1 to determine a proper execution pattern and execute the application program on the HPC system 3 using the proper execution pattern. That is, it becomes possible to suppress an improper execution pattern from being used in executing of the application program by the HPC system 3.

Second Embodiment

In the first embodiment described above, the formula for determining the performance value from the operating frequency and the consumption power and the formulas for determining the operating frequency and the consumption power from the power cap are generated as the performance model. In contrast, in a second embodiment described below, the equation for determining the performance value directly from the power cap is generated as the performance model.

Figure 19:
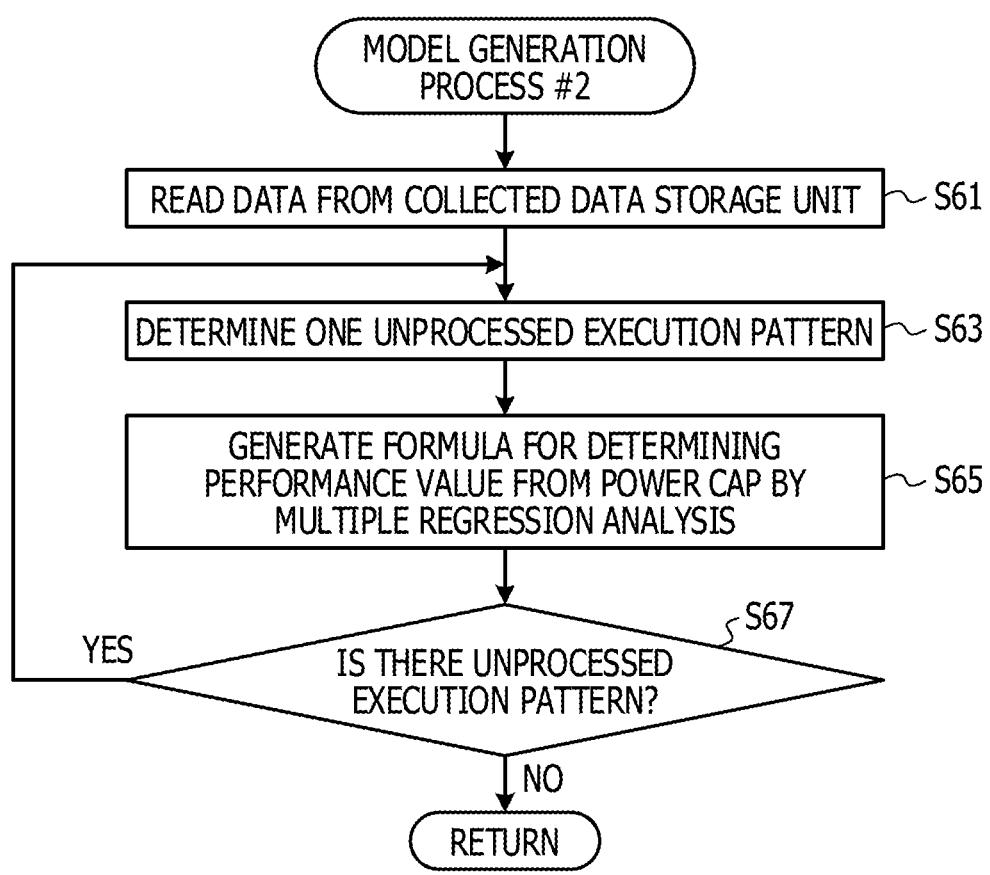
FIG. 19 is a diagram illustrating a processing flow of a model generation process according to a second embodiment.

A process executed in a model generation process according to the second embodiment is described below. FIG. 19 is a diagram illustrating a processing flow of the model generation process according to the second embodiment.

The generation unit 105 reads data from the collected data storage unit 111 (step S61 in FIG. 19). Note that in step S61, data associated with each execution pattern is read out.

The generation unit 105 determines one unprocessed execution pattern in a plurality of execution patterns specified by the user (step S63).

The generation unit 105 generates a formula for determining a performance value from power caps (power cap #1 and power cap #2 in this specific example) for the execution pattern determined in step S63 by multiple regression analysis using the data read out in step S61 (step S65). A specific example of the formula is performance value=power cap #1*coefficient #7+power cap #2*coefficient #8+constant #4. The generation unit 105 stores data (for example, coefficients, constants and the like) of the generated formula in the model data storage unit 115.

FIG. 20 is a diagram illustrating an example of data stored in the model data storage unit 115 according to the second embodiment. In the example illustrated in FIG. 20, values are stored respectively for the coefficient #7 and coefficient #8 and the constant #4. The data such as that illustrated in FIG. 20 is generated for each execution pattern.

The generation unit 105 determines whether there is an unprocessed execution pattern (step S67).

In a case where there is an unprocessed execution pattern (Yes in step S67), the process proceeds to step S63 (via Yes route after step S67). On the other hand, in a case where there is no unprocessed execution pattern (No in step 67), the process returns to the calling process.

Use of the performance model generated via the process described above makes it possible to calculate performance values even for power restrictions for which the calculation is not executed by the HPC system 3. Thus, it becomes possible to reduce the number of times the calculation is performed by the HPC system 3.

The present disclosure has been described above with reference to embodiments. However, the present disclosure is not limited to these embodiments. For example, the functional block configuration of the user terminal 1 described above may be different from an actual program module configuration.

Furthermore, the format of each table described above is merely an example, and the format may be different from the example described above. Furthermore, in the processing flows described above, the order of steps may be changed if no change occurs in the result. Furthermore, steps may be performed in parallel.

In the examples described above, the processes according to the embodiments are executed by the user terminal 1. Alternatively, the processes may be executed in a computation node in which an application program is executed.

In the examples described above, the application program is executed by one computation node. Alternatively, application programs may be executed by a plurality of computation nodes. In this case, the user terminal 1 may acquire a performance value and an index value of an operation of a computation node from each of the plurality of computation nodes in which the application programs are executed. In this case, a performance model of each computation node may be generated for each execution pattern. For computation nodes of the same type, a performance model may be generated for one of the computation nodes for each execution pattern.

In the examples described above, a performance model is generated for each execution pattern. Alternatively, depending on contexts of a plurality of execution patterns, only one performance model may be generated for the plurality of execution patterns.

Supplement

As a supplement, a method of calculating a performance value from consumption power of the CPU 31 in a simpler manner is described below. In the following discussion, it is assumed that two relationships described below are satisfied.

operating frequency=consumption power*coefficient #11+constant #11    (First Relationship)

performance value=operating frequency*coefficient #12+constant #12    (Second Relationship)

When the two linear relationships described above are satisfied, it is possible to calculate the performance value as performance value=(consumption power*coefficient #11+constant #11)*coefficient #12+constant #12.

Figure 21:
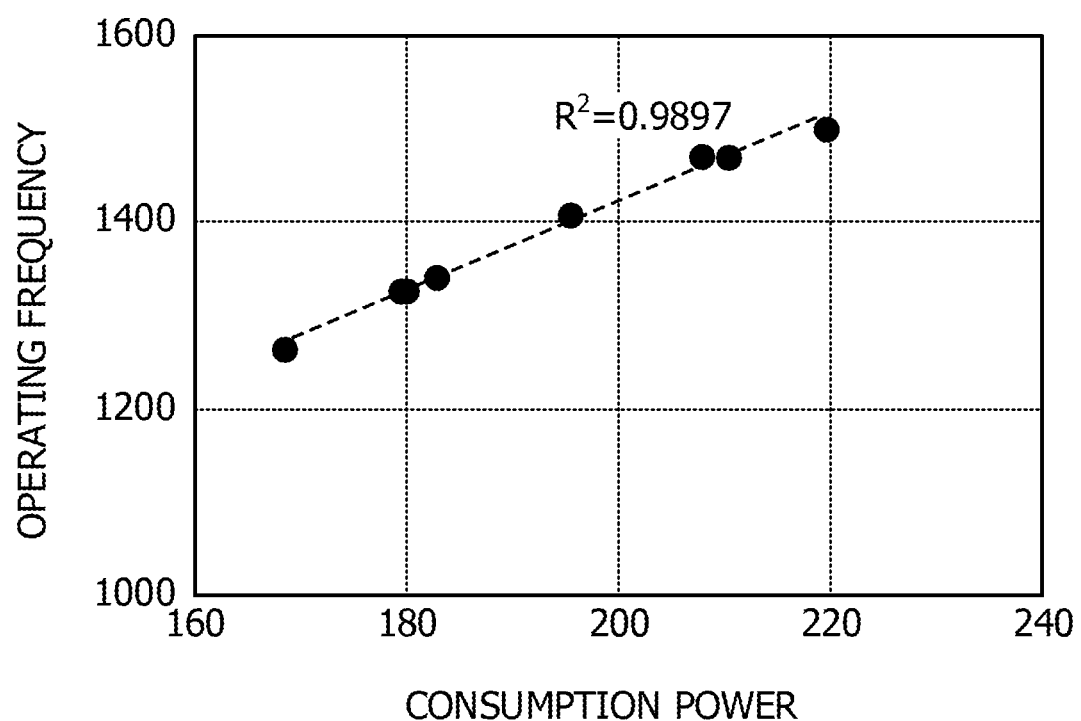
FIG. 21 is a diagram illustrating a relationship between an operating frequency and consumption power.

First, the first relationship is discussed. FIG. 21 illustrates a relationship between an operating frequency and a consumption power for a case where a certain application program (hereinafter referred to as an application program A1) is executed. In the example illustrated in FIG. 21, correlation coefficient $R^2$=0.9897, and thus there is a good linear relationship. Thus, in the first relationship, it is allowed to assume that a linear relationship is generally satisfied.

Figure 22:
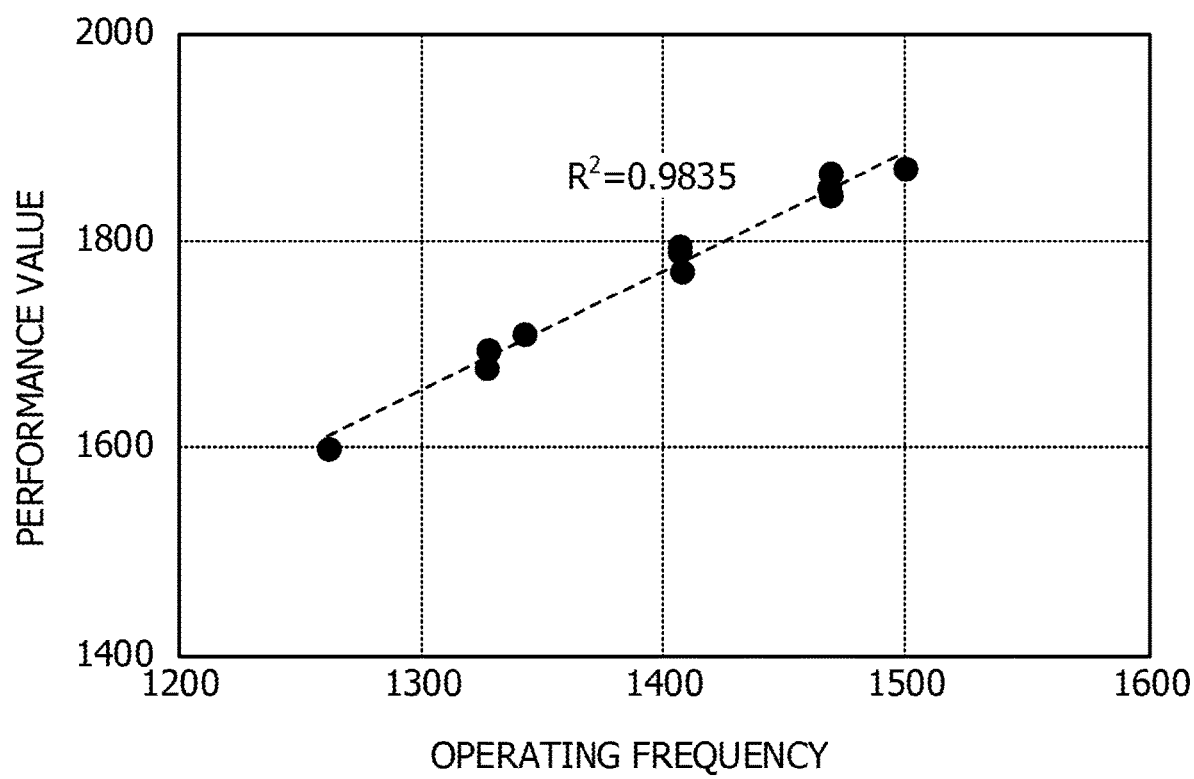
FIG. 22 is a diagram illustrating a relationship between a performance value and an operating frequency.
Figure 23:
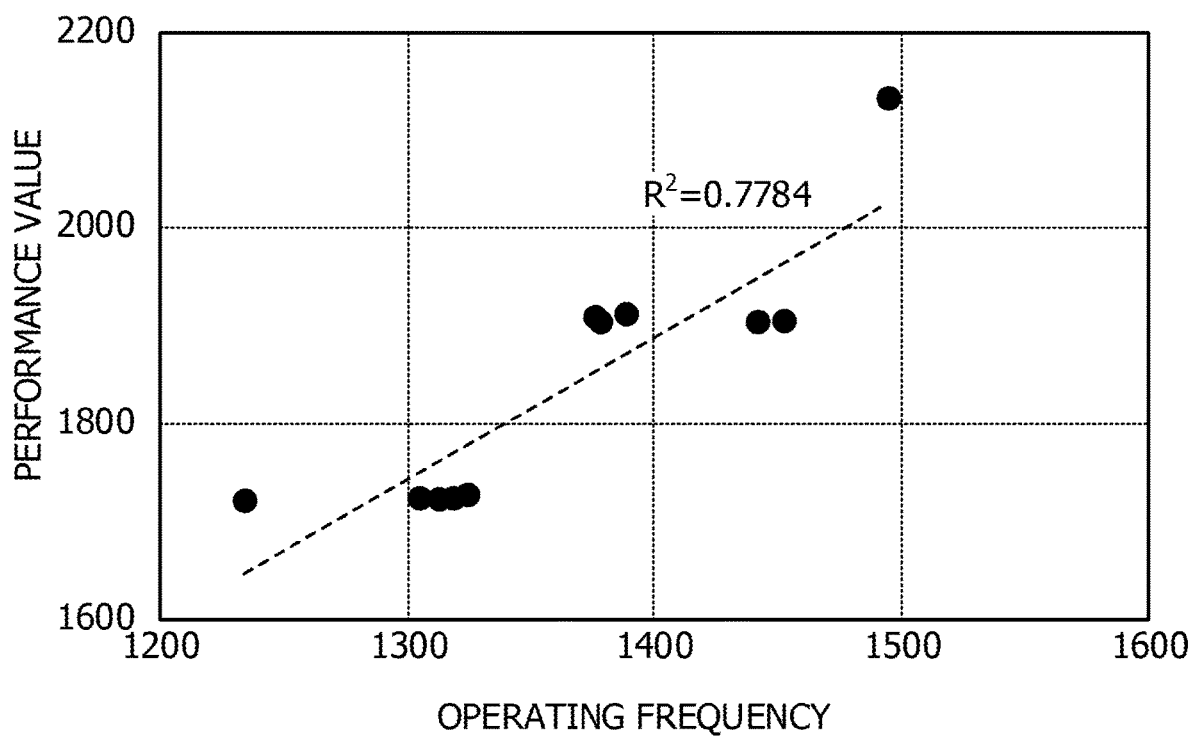
FIG. 23 is a diagram illustrating a relationship between a performance value and an operating frequency.

Next, the second relationship is discussed. FIG. 22 illustrates a relationship between a performance value and an operating frequency for a case where an application program (hereinafter referred to as an application program A2) different from the application program A1 is executed. In the example illustrated in FIG. 22, correlation coefficient $R^2$=0.9835, and thus a linear relationship is satisfied. However, the linear relationship is not satisfied for all cases. FIG. 23 is a diagram illustrating a relationship between a performance value and an operating frequency for a case where the application A1 is executed. In the example illustrated in FIG. 23, correlation coefficient $R^2$=0.7784, and thus there is no good linear relationship. That is, the second relationship does not satisfy a good linear relationship for all cases.

Therefore, for a case where it is known in advance that both the first relationship and the second relationship are satisfied, no problem occurs if a performance value is calculated from consumption power using the method described above.

The supplement has been described above.

Embodiments of the present disclosure can be summarized as follows.

In a first aspect, an information processing apparatus includes (A) a generation unit configured to generate a performance model for calculating a performance value of an application program from a power restriction for each set of parameters of the application program, based on data acquired when a computing apparatus executes an application program for each set of parameters of the application program under each of a plurality of power restrictions (the generation unit 105 in each embodiment is an example of the generation unit), (B) a calculation unit configured to calculate, for each set of parameters of the application program, the performance value of the application program from a first power restriction different from any of the plurality of power restrictions, based on the performance model generated for each set of parameters of the application program (the calculation unit 107 in each embodiment is an example of the calculation unit), (C) an output unit configured to output a set of parameters of the application program corresponding to a highest performance value of the calculated performance values (the control unit 101 in each embodiment is an example of the output unit).

An optimum value of a parameter of an application program may vary depending on a power restriction. However, by executing the process described above, it becomes possible to set a parameter of an application program to a proper value depending on a power restriction.

Note that the data described above may include a performance value. The generation unit (a1) may generate a performance model, in which an explanatory variable is a power restriction and an objective variable is a performance value, for each set of parameters of the application program by multiple regression analysis.

This makes it possible to calculate the performance value using the performance model even in a case where any factor other than the power restriction is not known.

The data described above may include a performance value and an index value regarding an operation of the computing apparatus, and the generation unit (a2) may generate a first performance model in which an explanatory variable is the power restriction and an objective variable is the index value and a second performance model in which an explanatory variable is the index value and an objective variable is the performance value for each set of parameters of the application program by multiple regression analysis. The index value may include at least one of values of an operating frequency of a processor in a computing apparatus, consumption power of the processor, temperature of the processor, and consumption power of a memory in the computing apparatus.

The parameters described above are closely related to the performance, and thus it is possible to calculate a proper performance value.

Each of the plurality of power restrictions may include an average power usable in a unit time and an average of power usable in a first period in the unit time.

It is possible to flexibly setting the maximum consumption power, it becomes possible to increase the processing performance of the computing apparatus.

The parameters of the application program may include at least one of a parameter set as an argument of the application program, a parameter set as an environment variable, and a parameter set in a file that is referred to when the application program is executed.

The information processing apparatus may further include (D) an acquisition unit configured to acquire data from the computing apparatus in a case where the computing apparatus executes an application program for each set of parameters of the application program under each of a plurality of power restrictions (the collection unit 103 in each embodiment is an example of the acquisition unit).

According to a second aspect, an information processing system includes (E) an information processing apparatus, and (F) a computing apparatus. The information processing apparatus includes (e1) a generation unit configured to generate a performance model for calculating a performance value of an application program from a power restriction for each set of parameters of the application program, based on data acquired when a computing apparatus executes an application program for each set of parameters of the application program under each of a plurality of power restrictions (the generation unit 105 in each embodiment is an example of the generation unit), (e2) a calculation unit configured to calculate, for each set of parameters of the application program, the performance value of the application program from a first power restriction different from any of the plurality of power restrictions, based on the performance model generated for each set of parameters of the application program (the calculation unit 107 in each embodiment is an example of the calculation unit), and (e3) an output unit configured to output a set of parameters of the application program corresponding to a highest performance value of the calculated performance values (the control unit 101 in each embodiment is an example of the output unit).

According to a third aspect, an information processing method includes (F) generating a performance model for calculating a performance value of an application program from a power restriction for each set of parameters of the application program, based on data acquired when a computing apparatus executes an application program for each set of parameters of the application program under each of a plurality of power restrictions, (G) calculating, for each set of parameters of the application program, a performance value of the application program from a first power restriction different from any of the plurality of power restrictions, based on the performance model generated for each set of parameters of the application program, and (H) outputting a set of parameters of the application program corresponding to a highest performance value of the calculated performance values.

It is possible to generate a program for causing a computer to execute the processes according to the method described above. The program may be stored in a computer-readable storage medium or a storage apparatus such as a flexible disk, a CD-ROM, a magneto-optical disk, a semiconductor memory, or the like. An intermediate processing result is temporarily stored in a storage apparatus such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus coupled to a computing system that includes a plurality of computing apparatuses, the information processing apparatus comprising:
   a memory; and
   a processor coupled to the memory and configured to:
      collect, for each of a plurality of combinations of a power restriction that includes a power cap indicating an average value of power consumption usable in a certain time period by a computing apparatus of the plurality of computing apparatuses and an execution pattern of an application program to be executed in the computing system, data acquired by executing the application program;
      generate, for each of a plurality of execution patterns of the application program, a first formula for acquiring a performance value of the application program from the power consumption and an operating frequency of the computing apparatus by executing multiple regression analysis using the collected data;
      generate, for each of a plurality of execution patterns of the application program, a second formula for acquiring the power consumption and the operating frequency from the power cap by executing the multiple regression analysis using the collected data;
      acquire a plurality of performance values of the application program corresponding to a first power restriction by using the first formula and the second formula, each of the plurality of performance values corresponding to one of the plurality of execution patterns;
      specify, from among the plurality of execution patterns, an execution pattern corresponding to a maximum performance value of the plurality of acquired performance values;
      output data including the specified execution pattern such that the specified execution pattern is distinguishable from another execution patterns; and
      transmit, to the computing system, a plurality of parameters of the application program corresponding to the specified execution pattern, the plurality of parameter being used when the system executes the application program.

2. The information processing apparatus according to claim 1, wherein
   the data includes the performance value, and
   the processor is configured to generate a performance model, in which an explanatory variable is a power restriction and an objective variable is a performance value, for each of the plurality of execution patterns of the application program by the multiple regression analysis.

3. The information processing apparatus according to claim 1 wherein
   the data includes the performance value and an index value regarding an operation of the computing apparatus,
   the processor is configured to generate a first performance model in which an explanatory variable is the power restriction and an objective variable is the index value and a second performance model in which an explanatory variable is the index value and an objective variable is the performance value for each of the plurality of execution patterns of the application program by the multiple regression analysis, and
   the index value includes at least one of values of an operating frequency of a processor in the computing apparatus, consumption power of the processor, temperature of the processor, and consumption power of a memory in the computing apparatus.

4. The information processing apparatus according to claim 1, wherein power restriction includes a first power cap indicating an average power usable in a unit time and a second power cap indicating an average of power usable in a first period in the unit time.

5. The information processing apparatus according to claim 1, wherein
   the execution pattern is a set of parameters of the application program, and
   the parameters includes at least one of a parameter set as an argument of the application program, a parameter set as an environment variable, and a parameter set in a file that is referred to when the application program is executed.

6. The information processing apparatus according to claim 1, wherein the processor is configured to when the computing apparatus executes the application program for each of the plurality of execution patterns of the application program under each of a plurality of power restrictions, acquire the data from the computing apparatus.

7. A system, comprising:
   an information processing apparatus; and
   a computing system coupled to the information processing apparatus and includes a plurality of computing apparatuses, the information processing apparatus includes:
   a memory; and
   a processor coupled to the memory and configured to:
      collect, for each of a plurality of combinations of a power restriction that includes of power consumption a power cap indicating an average value of power consumption usable in a certain time period by a computing apparatus of the plurality of computing apparatuses and an execution pattern of an application program to be executed in the computing system, data acquired by executing the application program;
      generate, for each of a plurality of execution patterns of the application program, a first formula for acquiring a performance value of the application program from the power consumption and an operating frequency of the computing apparatus by executing multiple regression analysis using the collected data;
      generate, for each of a plurality of execution patterns of the application program, a second formula for acquiring the power consumption and the operating frequency from the power cap by executing the multiple regression analysis using the collected data;
      acquire a plurality of performance values of the application program corresponding to a first power restriction by using the first formula and the second formula, each of the plurality of performance values corresponding to one of the plurality of execution patterns;
      specify, from among the plurality of execution patterns, an execution pattern corresponding to a maximum performance value of the plurality of acquired performance values;

output data including the specified execution pattern such that the specified execution pattern is distinguishable from another execution patterns; and transmit, to the computing system, a plurality of parameters of the application program corresponding to the specified execution pattern, the plurality of parameter being used when the system executes the application program.

8. A non-transitory computer-readable storage medium storing a program that causes a computer to execute a process, the computer being coupled to a computing system that includes a plurality of computing apparatuses, the process comprising:

collecting, for each of a plurality of combinations of a power restriction that includes a power cap indicating an average value of power consumption usable in a certain time period by a computing apparatus of the plurality of computing apparatuses and an execution pattern of an application program to be executed in the computing system, data acquired by executing the application program;

generating, for each of a plurality of execution patterns of the application program, a first formula for acquiring a performance value of the application program from the power consumption and an operating frequency of the computing apparatus by executing multiple regression analysis using the collected data;

generating, for each of a plurality of execution patterns of the application program, a second formula for acquiring the power consumption and the operating frequency from the power cap by executing the multiple regression analysis using the collected data;

acquiring a plurality of performance values of the application program corresponding to a first power restriction by using the first formula and the second formula, each of the plurality of performance values corresponding to one of the plurality of execution patterns;

specifying, from among the plurality of execution patterns, an execution pattern corresponding to a maximum performance value of the plurality of acquired performance values;

outputting data including the specified execution pattern such that the specified execution pattern is distinguishable from another execution patterns; and transmitting, to the computing system, a plurality of parameters of the application program corresponding to the specified execution pattern, the plurality of parameter being used when the system executes the application program.

9. The storage medium according to claim 8, wherein the data includes the performance value, and the generating includes generating a performance model, in which an explanatory variable is a power restriction and an objective variable is a performance value, for each of the plurality of execution patterns of the application program by the multiple regression analysis.

10. The storage medium according to claim 8 wherein the data includes the performance value and an index value regarding an operation of the computing apparatus, the generating includes generating a first performance model in which an explanatory variable is the power restriction and an objective variable is the index value and a second performance model in which an explanatory variable is the index value and an objective variable is the performance value for each of the plurality of execution patterns of the application program by the multiple regression analysis, and the index value includes at least one of values of an operating frequency of a processor in the computing apparatus, consumption power of the processor, temperature of the processor, and consumption power of a memory in the computing apparatus.

11. The storage medium according to claim 8, wherein the power restriction includes a first power cap indicating an average power usable in a unit time and a second power cap indicating an average of power usable in a first period in the unit time.

12. The storage medium according to claim 8, wherein the execution pattern is a set of parameters of the application program, and the parameters includes at least one of a parameter set as an argument of the application program, a parameter set as an environment variable, and a parameter set in a file that is referred to when the application program is executed.

13. The storage medium according to claim 8, further comprising when the computing apparatus executes the application program for each of the plurality of execution patterns of the application program under each of a plurality of power restrictions, acquiring the data from the computing apparatus.

14. The information processing apparatus according to claim 1, wherein the first power restriction is different from the collected power restriction.

15. The information processing apparatus according to claim 1, wherein the first formula is represented by a following equation:

$$\text{performance value} = \text{operating frequency} * \text{coefficient \#1} + \text{consumption power} * \text{coefficient \#2} + \text{constant \#1}.$$

wherein the coefficient #1 and the coefficient #2 are coefficient values and the constant #1 is a constant value.

16. The information processing apparatus according to claim 1, wherein the second formula is represented by following equations:

$$\text{operating frequency} = \text{power cap \#1} * \text{coefficient \#3} + \text{power cap \#2} * \text{coefficient \#4} + \text{constant \#2}, \text{ and}$$

$$\text{consumption power} = \text{power cap \#1} * \text{coefficient \#5} + \text{power cap \#2} * \text{coefficient \#6} + \text{constant \#3}.$$

wherein the coefficient #3, the coefficient #4, the coefficient #5 and the coefficient #6 are coefficient values, the power cap #1 and the power cap #2 are the power caps, and the constant #2 and the constant #3 are constant values.

17. The information processing apparatus according to claim 1, wherein the first power restriction is a power restriction for which a calculation is not executed by the computing system.

* * * * *